United States Patent [19]

Naruse

[11] Patent Number: 5,558,601
[45] Date of Patent: Sep. 24, 1996

[54] VEHICULAR PEDAL ASSEMBLY

[76] Inventor: Masuyuki Naruse, 603, Ohaza Noguchi, Taimei-machi, Tamana-gun, Kumamoto-ken, Japan

[21] Appl. No.: 337,373

[22] Filed: Nov. 8, 1994

[30] Foreign Application Priority Data

Nov. 12, 1993 [JP] Japan ............................ 5-283284

[51] Int. Cl.⁶ ............................................. F02D 9/06
[52] U.S. Cl. ................................. 477/213; 477/210
[58] Field of Search ............................ 477/210, 213, 477/215, 211, 212, 214

[56] References Cited

U.S. PATENT DOCUMENTS

| | | | |
|---|---|---|---|
| 2,164,921 | 7/1939 | Hoff | 477/210 |
| 3,108,651 | 10/1963 | Miller | 477/210 X |
| 3,916,719 | 11/1975 | Zwerenz | 477/214 X |
| 5,293,976 | 3/1994 | Naruse | 477/211 |

FOREIGN PATENT DOCUMENTS

0522556A1  1/1993  European Pat. Off. .

Primary Examiner—Charles A. Marmor
Assistant Examiner—Peter Kwon
Attorney, Agent, or Firm—Nikaido, Marmelstein, Murray & Oram LLP

[57] ABSTRACT

A pedal assembly comprising for driving a vehicle, comprising: a brake pedal (10) borne vertically swingably by a brake arm (11); a laterally biased accelerator lever (20) arranged just above the right-hand side of the brake pedal while being urged toward the brake pedal and having a lateral reciprocating stroke; and a guide roller (16) arranged at the right-hand portion of the brake pedal while having its circumferential edge protruded above the pedal. Further comprised is a spring (12) disposed on the floor of the vehicle below the brake pedal for urging the lower end portion of the brake pedal to this side. The accelerator lever is arranged, when in a non-load state, at an inclination with respect to the axis of the brake pedal.

3 Claims, 4 Drawing Sheets

VEHICULAR PEDAL ASSEMBLY

BACKGROUND OF THE INVENTION

1. Field of the Invention

The present invention relates to a pedal assembly to be used in a variety of vehicles including an automobile, a construction machine, an agricultural machine, an electric car and a solar car and, more particularly, to an improvement of a pedal assembly having its accelerator pedal depressed laterally.

2. Description of Related Art

In the pedal assembly of the prior art for driving the automobile or the like, generally speaking, the brake pedal and the accelerator pedal (or the clutch pedal) are arranged in parallel. In addition, the brake pedal is given a longer depression stroke than that of the accelerator pedal so that its depression has to make a large motion of the driver's leg around the hip joint, that is, the footwork has to follow the shape of letter "U" while moving the heel of the operating foot spatially. This is liable to cause troubles in case a quick operation is required. Specifically, since the operating foot fails to have its heel position fixed during the running operation in accordance with the characteristics of the drivers, it is liable to cause an accident at an emergency by depressing the pedal erroneously or with a delay. Especially in connection with the automatic cars, it has been reported that many accidents are caused because driver has to operate the pedal with one leg and finds difficulty to take the operating rhythm intrinsically.

In order to prevent such troubles in the parallel type pedal assembly, the present inventor has proposed a pedal assembly (as disclosed in Ep-A-0 522 556 A1), in which the accelerator pedal is laterally depressed and adjacently arranged just above the right-hand side of the brake pedal and is urged toward the underlying brake pedal and in which a guide roller is arranged at the right-hand end of the brake pedal while having its circumferential edge portion projected above the brake pedal.

The pedal assembly disclosed above is enabled to establish natural and quick associations between the accelerator pedal and the brake pedal and to guide the driver's foot naturally from the accelerator lever to the brake pedal even at an emergency when the foot gets stiff.

SUMMARY OF THE INVENTION

The present invention contemplates to improve the above specified pedal assembly better and has an object to provide a pedal assembly capable of further improving its operability and safety.

In order to achieve the above-specified object, according to the present invention, there is provided a pedal assembly comprising for driving a vehicle, comprising: a brake pedal borne vertically swingably by a brake arm; a laterally biased accelerator lever arranged just above the right-hand side of the brake pedal while being urged toward the brake pedal and having a lateral reciprocating stroke; and a guide roller arranged at the right-hand portion of the brake pedal while having its circumferential edge protruded above the pedal, wherein the improvement comprises a spring disposed on the floor of the vehicle below the brake pedal for urging the lower end portion of the brake pedal to this side, and wherein the accelerator lever is arranged, when in a non-load state, at an inclination with respect to the axis of the brake pedal.

Thanks to this construction, since the accelerator lever is arranged at an inclination with respect to the brake pedal axis, the operating foot naturally leaves the accelerator lever instantly when the brake pedal is depressed for the braking operation from the operation of the accelerator lever. As a result, the operating foot can be kept away from contact with the root of the accelerator lever to prevent the malfunction of racing the acceleration simultaneously with the braking operation, to quicken the braking operation. Moreover, the brake pedal is returned, if released from its depressed state into the non-load state, to its original position. In addition, the brake pedal has its lower end quickly returned by the spring disposed on the floor, because its upper end is hinged to the brake arm whereas its lower end made slidable on the floor.

The accelerator lever includes an operating face curved in a recessed shape and mounted at an inclination in the downward direction, so that the operability is improved. In this accelerator lever, more specifically, the depressed operating foot is turned rightward while being returned, when it is shifted from the braking state to the accelerating operation. Since the operating foot portion contacting with the accelerator lever is turned upwards, it can grasp the operating face inclined downwards and curved in the recessed shape, reliably without any slippage.

Still moreover, the guide roller has its one end made polygonal and its other end made circular and is alternately formed with triangular arcuate recesses and flat faces or arcuate recesses, so that the operability between the brake pedal and the accelerator lever can be better improved. Specially, the operating foot is reciprocated, while passing between the brake pedal and the accelerator lever, within a predetermined angle about the heel while rolling on the guide roller. During the running operation at a predetermined speed, however, the operating foot may stand still on the guide roller. Even in this case, the operating foot is more stabilized and less fatigued on the triangular flat faces or the arcuate recesses than the case in which the contacting faces between the operating foot and the guide roller are provided by the circumference only.

DESCRIPTION OF THE PREFERRED EMBODIMENTS

Figure 1:
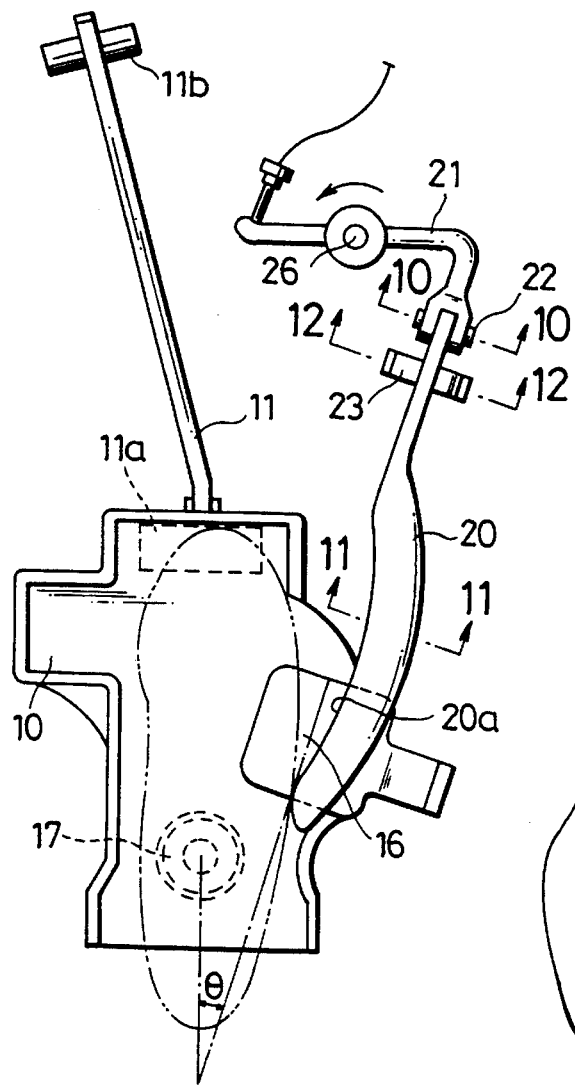
FIG. 1 is a top plan view schematically showing a pedal assembly according to an embodiment of the present invention.
Figure 2:
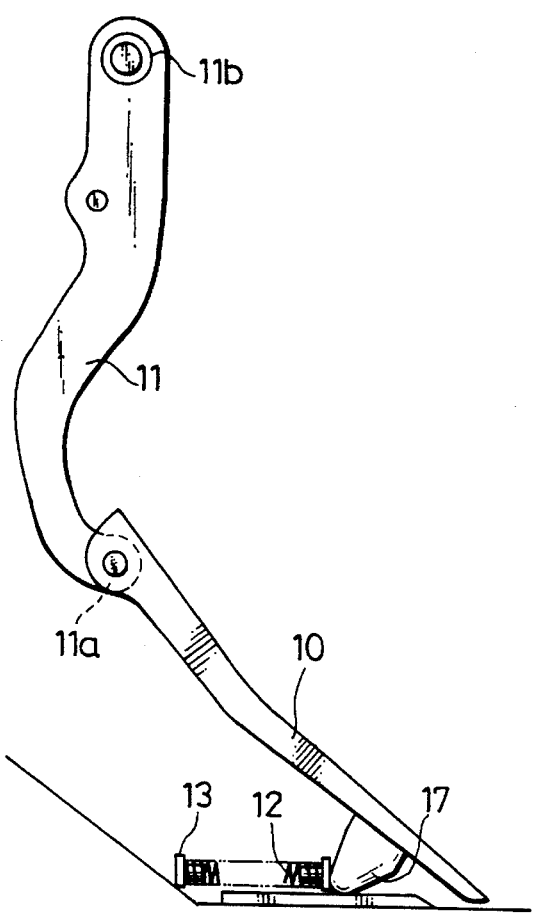
FIG. 2 is a left-hand side elevation schematically showing a connected state of a brake pedal and a brake arm of the pedal assembly.

FIG. 1 is a top plan view showing a pedal assembly according to an embodiment of the present invention. In FIG. 1, reference numeral 10 designates a brake pedal, and numeral 20 designates an accelerator lever.

The brake pedal 10 has its upper end center supported by a brake arm 11 and its lower end side urged toward the driver by a spring 12 arranged on the floor just below the brake pedal 10. The brake arm 11 is equipped at its upper and lower ends with connecting bearings 11a and 11b. To the lower end bearing 11a, there is rotatably connected the leading end of the brake pedal 10.

Figure 3:
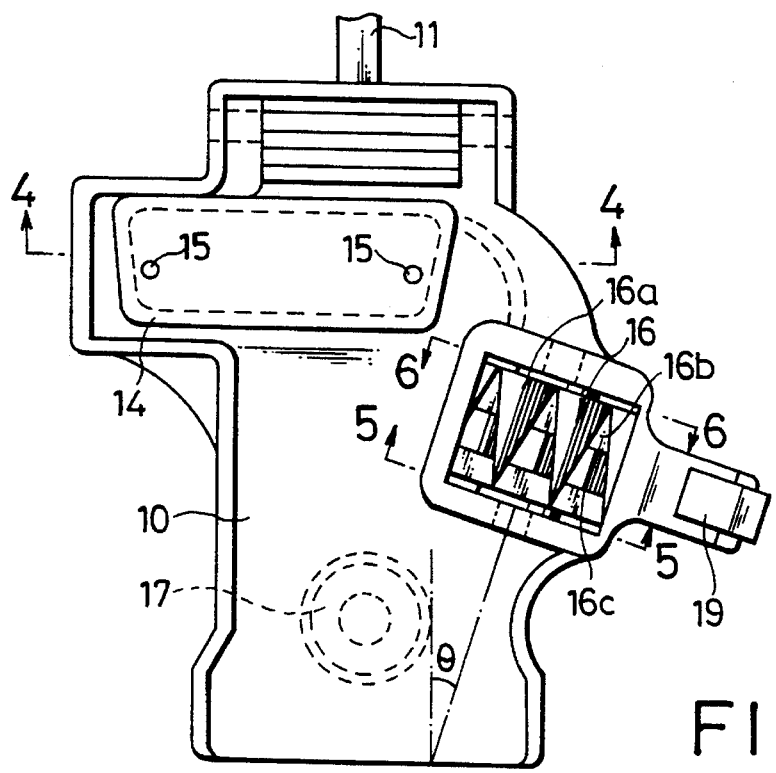
FIG. 3 is a top plan view showing the brake pedal of the pedal assembly.
Figure 4:
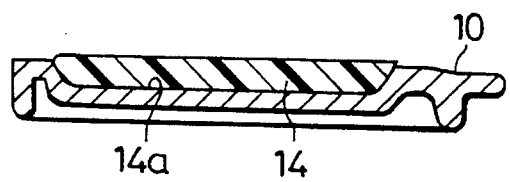
FIG. 4 is a section taken along line A—A of FIG. 3.

The brake pedal 10 is equipped, as shown in FIGS. 3 and 4, with a non-slip 14 made of a synthetic resin or rubber. This non-slip 14 is fixed by screws 15 or the like in a recess 14a which is formed in the upper end surface of the brake pedal 10. The brake pedal 10 is formed at its right-hand side with an opening, from which is protruded the circumferential edge of a rotatable guide roller 16.

Figure 5:
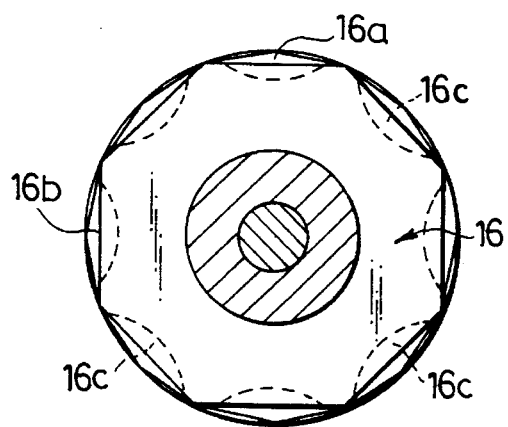
FIG. 5 is a section taken along line B—B of FIG. 3.
Figure 6:
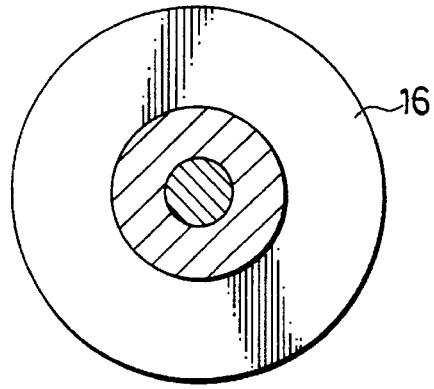
FIG. 6 is a section taken along line C—C of FIG. 3.

As shown in FIGS. 3, 5 and 6, the guide roller 16 has its root end portion made octagonal and its leading end portion made circular and is alternately formed on its circumference with triangular arcuate recesses 16a and flat faces 16b. Moreover, these flat faces 16b are formed at their central portions with arcuate recesses 16c as shown in FIG. 4. The guide roller 16 thus formed has its axis inclined at a predetermined angle with respect to the axis of the brake pedal 10. This angle of inclination is set to 20 degrees or less because the angle for the operating foot of the driver to swing outwards is about 20 degrees at the maximum.

Figure 7:
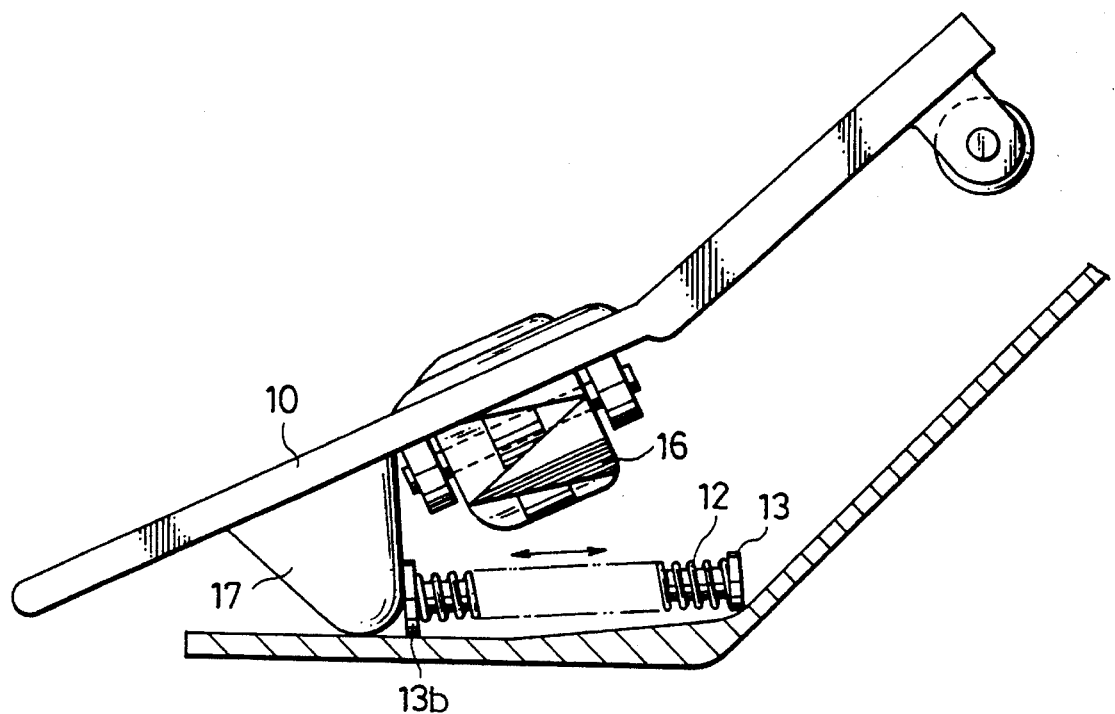
FIG. 7 is a side elevation showing a relation between the brake pedal and a spring of the pedal assembly.
Figure 8:
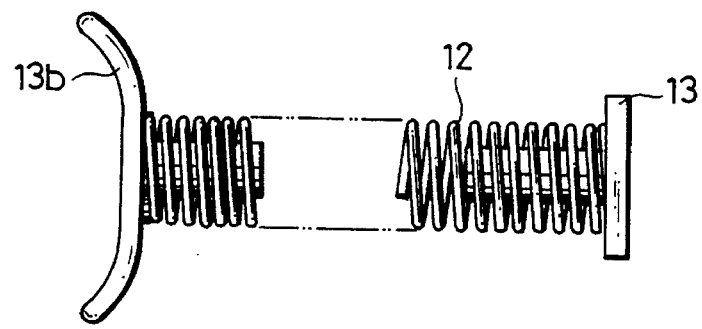
FIG. 8 is a top plan view showing the spring.
Figure 9:
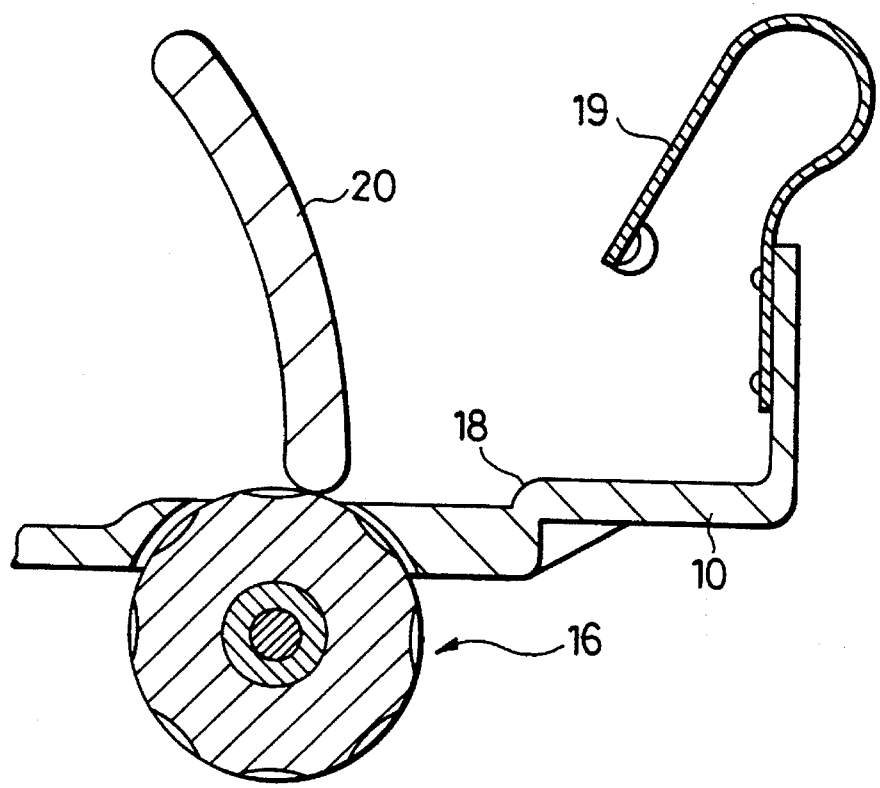
FIG. 9 is a section of an essential portion showing an arrangement of the brake pedal and an accelerator lever.

On the back of the lower end portion of the brake pedal 10, there is erected one support leg 17 having its leading end rounded to slidably contact with the floor thereby to support the brake pedal 10. This support leg 17 is in abutment against that end of the spring 12, which is located at the side of the driver. The spring 12 per se has its one end mounted on a receiving member 13 fixed on the floor and its other end (at the driver side) mounted on a receiving plate 13b, as shown in FIGS. 7 and 8. Moreover, the receiving plate 13a at the driver side is made movable back and forth by the support leg 17. With this arrangement, not only the upper end but also the lower end of the brake pedal 10 is moved forwards, when depressed, against the urging force of the spring 12. When the brake pedal 10 is released from its depressed state, the upper end is returned to restore its original position at the driver side by the urging force applied to the brake arm 11, and the lower side is also returned to its original position by the urging force of the spring 12.

The brake pedal 10 is formed thereon with a stepped portion 18 at the right-hand side of the guide roller 16, and a leaf spring 19 is attached to the right-hand edge of the brake pedal 10. The stepped portion 18 can be sensed by the driver when the accelerator lever 20 is depressed to the stepped portion 18. If the accelerator lever 20 is further depressed over the stepped portion 18, it comes into abutment against the leaf spring 19 so that its further depression is stopped.

The accelerator lever 20 is arranged just above the right-hand end of the brake pedal 10 such that it is urged toward the brake pedal 10 and such that it takes the same angle in a no-load state as the aforementioned angle of inclination of the guide roller 16 with respect to the axis of the brake pedal 10, that is, within the outward swinging angle of 20 degrees of the operating foot. Moreover, the accelerator lever 20 is located to have its operating or abutting face 20a located above the top of the guide roller 16.

Figure 10:
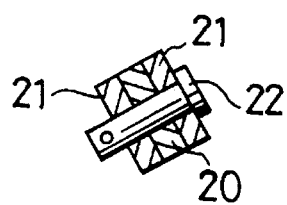
FIG. 10 is a section taken along line E—E of FIG. 1 and shows the accelerator lever.
Figure 11:
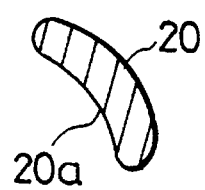
FIG. 11 is a section taken along line F—F of FIG. 1 and shows the accelerator lever.
Figure 12:
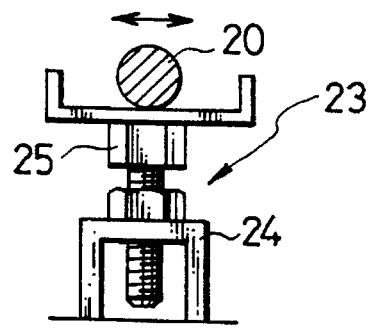
FIG. 12 is a section taken along line D—D of FIG. 1 and shows the accelerator lever.

The accelerator lever 20 thus arranged has its root end hinged to a turning arm 21 through a pin 22. This turning arm 21 is rotatably supported by a pin 26 and has its one end connected to the not-shown carburetor or the like through a wire. The connection between the turning arm 21 and the accelerator lever 20 is slightly inclined with respect to the horizontal plane, as shown in FIG. 10. The operating face of the accelerator lever 20, as located at the free end of this side, is curved in a recessed shape and inclined toward the brake pedal 10 (as seen from FIG. 11).

Below the accelerator lever, there is disposed a bearing member 23. This bearing member 23 is provided for stopping the accelerator lever 20 at a predetermined level, because the accelerator lever 20 is allowed to go down together with the brake pedal 10 as the latter is depressed, until it comes into abutment against the bearing member 23. Thus, when the braking is released to allow the brake pedal 10 to return, the accelerator level 20 returns together. Here, the bearing member 23 is composed of a root portion 24 fixed on the floor and an adjust screw 25 fastened in the root portion 24. As a result, the supporting level of the accelerator lever 20 can be freely adjusted by turning the adjust screw 25.

Here will be described the operations of the pedal assembly thus constructed. First of all, in the case of a braking operation, the brake pedal 10 is depressed like the ordinary one. Then, the not-shown hydraulic cylinder is driven through the brake arm 11. With the brake pedal being depressed, the accelerator lever 20 is prevented from any further downward movement by the aforementioned bearing member 23 and is positioned above the depression face of the brake pedal so that the operating foot is safely kept out of contact with the accelerator lever.

In the case of a shift from the braking operation to the operation of the accelerator lever, the operating foot 27 may have its toe raised to this side around the heel to interrupt the depression of the brake pedal 10 and may be turned rightward, as shown in FIG. 1, with the heel being held on the floor. When the operating foot releases the accelerator lever 20, this lever 20 is returned to its original position by the urging force of the not-shown coil spring.

In the case of a shift from the accelerating operation to the braking operation, the accelerator lever 20 naturally leaves the operating foot simultaneously with the depression of the brake pedal 10, because the accelerator lever 20 is arranged not in parallel with the axis of the brake pedal 10 but at an inclination of the outward swinging direction of the operating foot. As a result, the foot will naturally leave the accelerator lever to assure the safety even in case the driver is feared to have his leg stretched at the time of a runaway.

Moreover, the guide roller 16 smoothens the motion of the operating foot between the accelerator lever 20 and the brake pedal 10. Specifically, the operating foot is not dragged by the friction or the like during its swinging motion between the accelerator lever 20 and the brake pedal 10, because the swinging motion is smoothened by the rotations of the guide roller 16. In the operation of the accelerator lever, moreover, the operating foot can be stabilized on the triangular flat faces of the guide roller providing a wide contact area. In the braking operation, on the other hand, the operating foot can be instantly released by the circular outer circumference at the leading end portion of the guide roller 16.

Incidentally, the present invention can naturally be applied not only to an automobile but also a variety of vehicles such as construction machines or agricultural machines.

As has been described hereinabove, according to the pedal assembly of the present invention, the accelerator lever is arranged at an inclination with respect to the axis of the brake pedal so that the operating foot is naturally released from the accelerator lever at the instant when it depresses the brake pedal. As a result, the malfunction of racing the engine simultaneously with the braking operation can be eliminated to quicken the braking operation thereby to improve the operability and the safety.

Further, the accelerator lever is formed with the arcuately curved operating face, and this operating face is inclined downward. As a result, the operability is improved in that the operating foot can grasp the operating face of the accelerator lever reliably without slippage at the shifting time from the braking state to the accelerating operation.

Furthermore, the guide roller is given the polygonal shape at its one end and the circular shape at its other end and is alternately formed on its circumference with the triangular flat faces or arcuate recesses, so that the operating foot can be stabilized and given less fatigue during the running operation.

I claim:

1. A pedal assembly comprising for driving a vehicle, said pedal assembly comprising:

a brake pedal swingably disposed on a brake arm;

a laterally biased accelerator lever arranged above the right-hand side of said brake pedal, said accelerator lever being urged toward said brake pedal and being configured to have a lateral reciprocating stroke; and a guide roller arranged at the right-hand portion of said brake pedal, said guide roller having a circumferential edge thereof protruded above the brake pedal, wherein the a spring is disposed on a floor of the vehicle below said brake pedal, said spring urging a lower end portion of said brake pedal in a predetermined direction, and wherein said accelerator lever is arranged, when in a non-load state, at an inclination with respect to an axis of said brake pedal.

2. A pedal assembly according to claim 1, wherein said accelerator lever includes an operating face curved in a recessed shape and mounted at an inclination in the downward direction.

3. A pedal assembly according to claim 1 or 2, wherein said guide roller has its one end made polygonal and its other end made circular and is alternately formed with triangular arcuate recesses and flat faces or arcuate recesses.

* * * * *